United States Patent
Lin et al.

(10) Patent No.: US 9,825,534 B2
(45) Date of Patent: Nov. 21, 2017

(54) DUMMY LOAD CONTROLLERS AND CONTROL METHODS FOR POWER SUPPLIES CAPABLE OF QUICKLY LOWERING OUTPUT VOLTAGE AT OUTPUT NODE

(71) Applicant: Leadtrend Technology Corporation, Hsinchu (TW)

(72) Inventors: Chao-Chih Lin, Hsinchu (TW); Ming Chang Tsou, Hsinchu (TW); Meng Jen Tsai, Hsinchu (TW)

(73) Assignee: LEADTREND TECHNOLOGY CORPORATION, Hsinchu (JP)

( * ) Notice: Subject to any disclaimer, the term of this patent is extended or adjusted under 35 U.S.C. 154(b) by 202 days.

(21) Appl. No.: 14/716,987

(22) Filed: May 20, 2015

(65) Prior Publication Data

US 2015/0357924 A1 Dec. 10, 2015

Related U.S. Application Data

(60) Provisional application No. 62/007,476, filed on Jun. 4, 2014.

(51) Int. Cl.
*H02M 1/32* (2007.01)
*H02M 3/335* (2006.01)

(52) U.S. Cl.
CPC .......... *H02M 3/33507* (2013.01); *H02M 1/32* (2013.01)

(58) Field of Classification Search
CPC ............. H02M 1/32; H02M 2001/322; H02M 2001/325
USPC ....... 363/13, 15, 16, 20, 21.01, 21.12, 21.18
See application file for complete search history.

(56) References Cited

U.S. PATENT DOCUMENTS

| | | | | |
|---|---|---|---|---|
| 4,638,433 | A * | 1/1987 | Schindler | E05F 15/668 160/189 |
| 6,184,649 | B1 * | 2/2001 | Phlipot | H02J 7/0075 320/100 |
| 8,810,143 | B2 | 8/2014 | Zhang | |
| 2008/0232018 | A1 * | 9/2008 | Yang | H02M 1/32 361/94 |
| 2009/0010027 | A1 * | 1/2009 | Nishikawa | H02M 3/33515 363/21.01 |

(Continued)

FOREIGN PATENT DOCUMENTS

TW   M302830   12/2006
TW   201301952   1/2013

*Primary Examiner* — Jeffrey Gblende
*Assistant Examiner* — David A. Singh
(74) *Attorney, Agent, or Firm* — McClure, Qualey & Rodack, LLP

(57) ABSTRACT

A power converter provides a dummy load to lower an output voltage under a light-load or no-load condition. The power converter has a primary winding and a secondary winding isolated from each other. The secondary winding can de-energize to provide the output voltage at an output node for powering a load. The winding voltage at across the secondary winding is sensed to provide a non-switching time, which is checked if it exceeds a predetermined reference time. The output voltage is compared with a predetermined voltage. A discharge current is provided as the dummy load to drain from the output node and to lower the output voltage if the on-switching time exceeds the predetermined reference time and the output voltage exceeds the predetermined voltage.

17 Claims, 5 Drawing Sheets

(56) References Cited

U.S. PATENT DOCUMENTS

| | | | |
|---|---|---|---|
| 2009/0213623 A1* | 8/2009 | Yang | H02M 3/33507 363/49 |
| 2009/0219003 A1* | 9/2009 | Yang | H02M 3/33592 323/283 |
| 2011/0193481 A1* | 8/2011 | Nakamura | H05B 41/2882 315/82 |
| 2013/0294116 A1* | 11/2013 | Pan | H02M 1/32 363/21.09 |
| 2014/0078789 A1* | 3/2014 | Li | H02M 3/33523 363/21.15 |
| 2014/0132228 A1* | 5/2014 | Lin | H02M 1/32 323/207 |
| 2015/0208469 A1* | 7/2015 | Coetzee | H02M 1/36 315/307 |
| 2015/0229223 A1* | 8/2015 | Cao | H02M 3/33515 363/21.13 |

* cited by examiner

DUMMY LOAD CONTROLLERS AND CONTROL METHODS FOR POWER SUPPLIES CAPABLE OF QUICKLY LOWERING OUTPUT VOLTAGE AT OUTPUT NODE

CROSS-REFERENCE TO RELATED APPLICATION

This application claims priority to and the benefit of U.S. provisional application Ser. No. 62/007,476 filed on Jun. 4, 2014, which is incorporated by reference in its entirety.

BACKGROUND

The present disclosure relates generally to power supplies, and more particularly to apparatuses and control methods for providing dummy loads to power supplies under primary-side control.

The battery run time, the duration when a portable device is operable under the power supplied by its own batteries, means a lot to users. A short battery run time troubles user in non-operable device or frequently charging. To make battery run time longer, the capacity of the batteries in portable devices becomes larger. Aside effect of the batteries with larger capacity is a longer charging time which is required for a battery charger to charge the batteries to a full condition. Some manufactories of battery chargers have developed methods for quickly charging batteries, so users need not wait so long to fully charge their portable devices.

A common methodology of quickly charging batteries is to increase the output voltage supplied by a battery charger. For example, a USB port of a charger has an output rating voltage about 5V, but that charger, if equipped with the ability of quickly charging, might boost its output voltage up to between 9V and 12V to charge a portable device. Nevertheless, a portable device that is to be charged by a 9V input voltage must be specially designed to sustain a so-high charge voltage. Otherwise, that portable device could be over stressed and suffer damage.

To be backward compatible with old-version portable devices that are unable to sustain a high-charge voltage, the output voltage of a battery charger with the ability of quickly charging must lower its output voltage down to its output rating voltage quickly after a portable device is removed, so that the charger won't damage any of old-version portable devices that does not support quickly charging and is next connected to the output port of the charger.

Demonstrated in FIG. 1 is a conventional charger 100 with the ability of quickly charging, for charging the load 104. The charger 100 has an isolation topology, with a primary side and a secondary side isolated from each other by a transformer. Voltages at the primary side substantially reference to input ground $GND_{IN}$, while voltages at the secondary side to output ground $GND_{OUT}$. As illustrated in FIG. 1, a power controller 108 in the primary side turns ON and OFF a power switch 106 so as to control the current through a primary winding PRM. When power switch 106 is turned ON, the current through the primary winding PRM increases and the transformer energizes; when it is turned OFF, the transformer de-energizes and the secondary winding SEC outputs a current to build output voltage $V_{OUT}$. The auxiliary winding AUX, the secondary winding SEC, and voltage divider 110 cooperate to provide information in association with the output voltage $V_{OUT}$, and power controller 108 accordingly provides pulse-width-modulation (PWM) signal $S_{DRV}$ to control power switch 106. This type of control is commonly referred to as primary side control (PSR), which detects output voltage $V_{OUT}$ by way of the induced voltage of a transformer, rather than through a photo-coupler. The charge 100 includes a dummy load $R_{DUM}$, which is capable of lowering the output voltage $V_{OUT}$ down to a safe level when the load 104 is removed or becomes a light load.

The presence of the dummy load $R_{DUM}$ causes disadvantages in view of power conversion, because it constantly consumes electric power no matter the load 104 exists or not. Therefore, the dummy load $R_{DUM}$ is not suitable for advanced chargers, especially for those seeking a higher power conversion rate.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
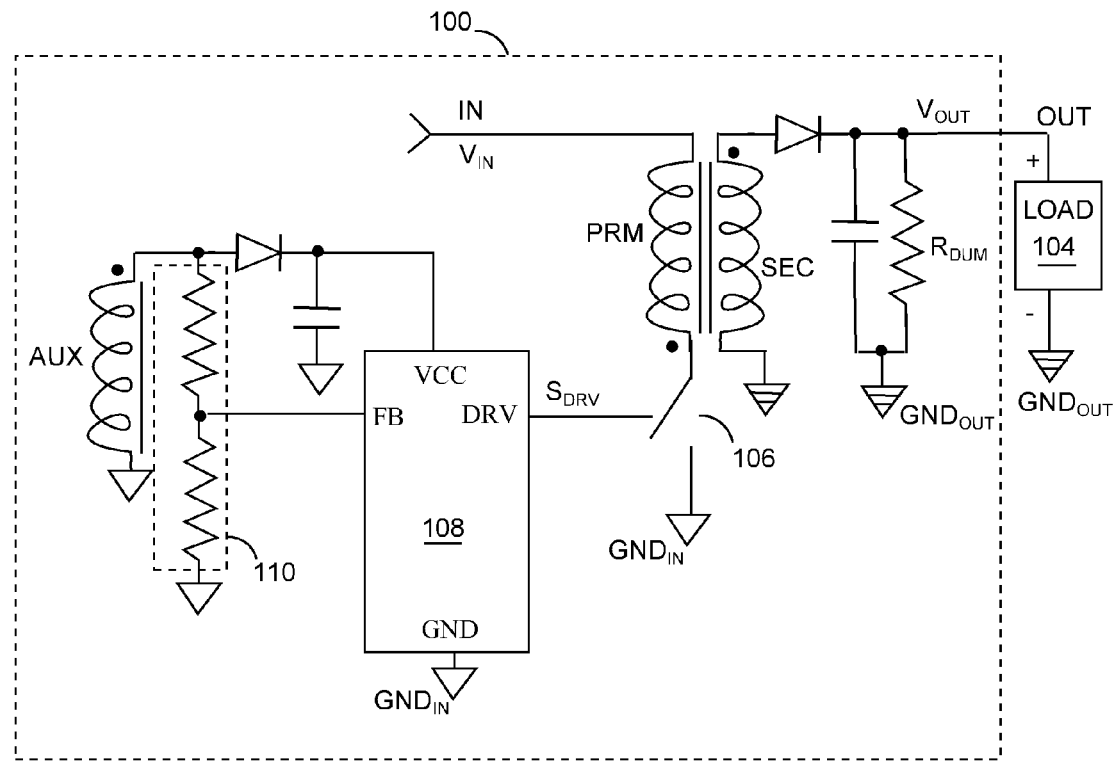
FIG. 1 shows a conventional charger with the ability of quickly charging.
Figure 2:
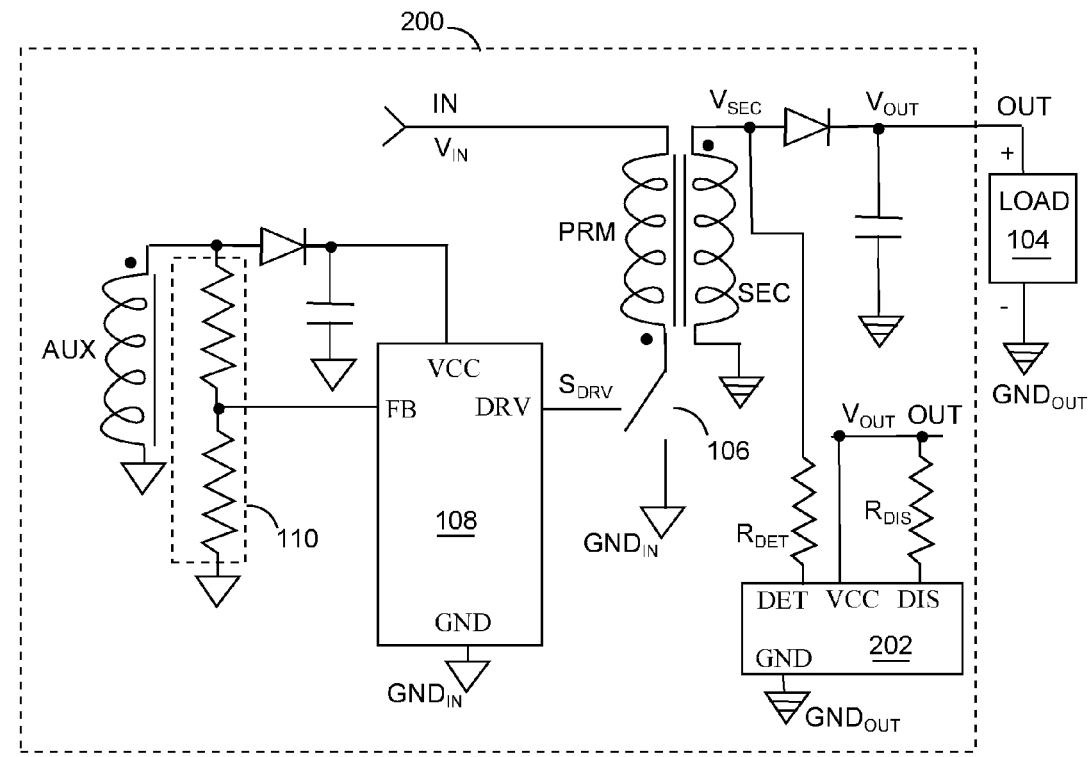
FIG. 2 shows a charger in accordance with embodiments of the invention.

FIG. 2 shows a charger 200 in accordance with embodiments of the invention. The charge 200 in FIG. 2 has a detection resistor $R_{DET}$, a discharge resistor $R_{DIS}$, and a dummy-load control unit 202, but lacks the dummy load $R_{DUM}$ in FIG. 1. If the dummy-load control unit 202 determines the load 104 is a light load or no load, it internally provides a dummy load to discharge the output node OUT, preventing the output voltage $V_{OUT}$ from over-high. The output rating voltage of the charger 200 is 5V, meaning that the output voltage $V_{OUT}$ is regulated to be 5V when the load 104 is a light load or a no load. When the dummy-load control unit 202 determines the load 104 is heavier than a light load, it stops providing the dummy load, so that the power conversion rate is kept high.

The dummy-load control unit 202 detects winding voltage $V_{SEC}$ via the detection resistor $R_{DET}$. The dynamic signal of the winding voltage $V_{SEC}$ carries load information based on which the dummy-load control unit 202 determines whether the load 104 is a normal load, a light load or a no load. In this specification, a normal load means the load 104 is heavier than a predetermined value, and a light load or no load means the load 104 is lighter than the predetermined value. In case that the dummy-load control unit 202 deems the load 104 normal, it makes its discharge charge node DIS a high-impedance input node, substantially no current flowing through the discharge resistor $R_{DIS}$ to keep power conversion rate high. If the dummy-load control unit 202 deems the load 104 being a light load or no load, and the output voltage $V_{OUT}$ is over-high, then the dummy-load control unit 202 provides a discharge path from the discharge node DIS to output ground $GND_{OUT}$. This discharge path conducts a discharge current to discharge the output node OUT and to quickly lower the output voltage $V_{OUT}$ down to a safe level. Therefore, if the load 104 is replaced by another load, the output voltage $V_{OUT}$ always starts at the safe level at most and causes no harm to the load.

Figure 3:
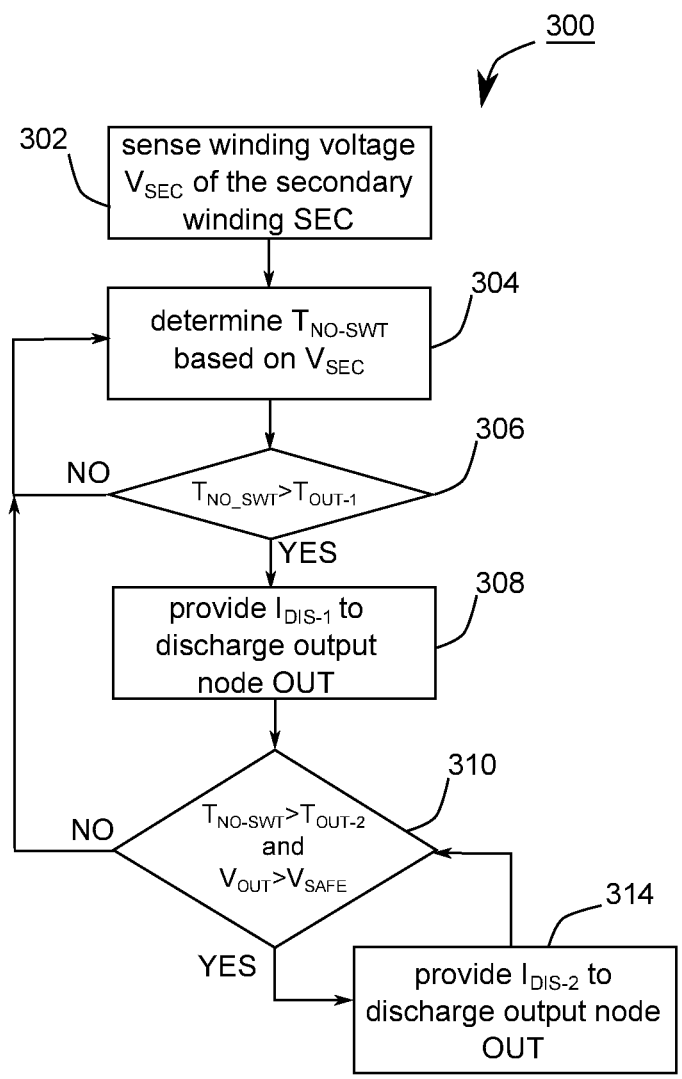
FIG. 3 shows a control method suitable for use in the dummy-load control unit of FIG. 2.

FIG. 3 shows a control method 300 suitable for use in the dummy-load control unit 202 of FIG. 2. In step 302, dummy-load control unit 202 senses the winding voltage $V_{SEC}$ via the detection resistor $R_{DET}$. Step 304 determines a non-switching time $T_{NO\text{-}SWT}$ when the power switch in the primary side is not switched to change its condition based on the winding voltage $V_{SEC}$. For example, the non-switching time $T_{NO\text{-}SWT}$ could be the duration when the winding voltage $V_{SEC}$ continues not to go across a reference voltage $V_{REF}$. Step 306 decides whether the non-switching time $T_{NO\text{-}SWT}$ exceeds a predetermined reference time $T_{OUT\text{-}1}$. A positive answer of step 306 likely could mean the load 104 is a light load or no load at this moment, so step 308 follows, providing a discharge current $I_{DIS\text{-}1}$ to discharge the output node OUT. Step 310 further determines whether the non-switching time $T_{NO\text{-}SWT}$ exceeds another predetermined reference time $T_{OUT\text{-}2}$ longer than the predetermined reference time $T_{OUT\text{-}1}$ and whether the output voltage $V_{OUT}$ is over-high, e.g. exceeding a predetermined safe level $V_{SAFE}$. If each of the inquiries in step 310 has a positive answer, it seems like that quickly charging just completes or ends, and step 314 follows to provide another discharge current $I_{DIS\text{-}2}$ which, larger than the discharge current $I_{DIS\text{-}1}$, discharges the output node OUT via the discharge resistor $R_{DIS}$. If any of the answers in steps 310 and 306 is negative, step 304 follows.

Figure 4:
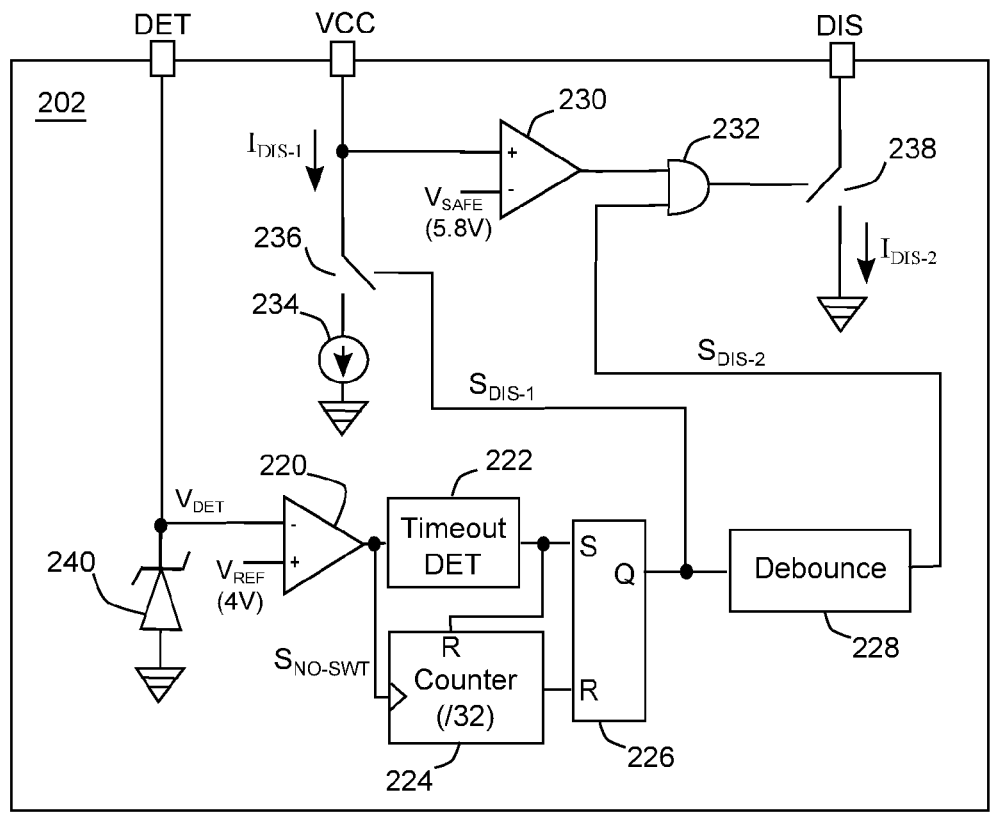
FIG. 4 exemplifies the dummy-load control unit in FIG. 2.

FIG. 4 exemplifies the dummy-load control unit 202. A Zener diode 240 limits the highest and lowest voltages at the detection node DET. In FIG. 4, the detection voltage $V_{DET}$ at the detection node DET is kept substantially above 0V. A comparator 220 compares the detection voltage $V_{DET}$ with a reference voltage $V_{REF}$, which is 4V in FIG. 4 for instance. In another embodiment of the invention, the reference voltage $V_{REF}$ is not a constant, but in association with the output voltage $V_{OUT}$ instead, and equal to $0.8*V_{OUT}$ for example. If the winding voltage $V_{SEC}$ exceeds 0V, the detection voltage $V_{DET}$ could be substantially the same with the winding voltage $V_{SEC}$ The comparator 220 outputs a comparison result $S_{NO\text{-}SWT}$.

Timeout detector 222 mainly detects a duration when the comparison result $S_{NO\text{-}SWT}$ does not change its logic value, and this duration is deemed as a non-switching time $T_{NO\text{-}SWT}$. In one embodiment, if the non-switching time $T_{NO\text{-}SWT}$ is longer than the predetermined reference time $T_{OUT\text{-}1}$, the timeout detector 222 outputs "1" in logic; otherwise, it outputs "0". In another embodiment, the timeout detector 222 acts as a debounce circuit and has its output "1" only if the comparison result $S_{NO\text{-}SWT}$ lasts to be "1" in logic for the predetermined reference time $T_{OUT\text{-}1}$. The output of the timeout detector 222, while having "1" in logic, sets the SR flip flop 226 and resets the counter 224, which then starts to count from number "0". The comparison result $S_{NO\text{-}SWT}$ is also fed to the clock input of the counter 224, which calculates how many times the comparison result $S_{NO\text{-}SWT}$ turns to be "1" from "0". When the calculation result of the counter 224 exceeds a certain number, 32 as shown in FIG. 4 for example, the SR flip flop 226 is reset. A timeout signal $S_{DIS\text{-}1}$ at the non-inverted output Q of the SR flip flop 226, while in logic "1", makes the switch 236 a short circuit, so a constant current source 234 generates discharge current $I_{DIS\text{-}1}$ to drain charges from power node VCC, equivalently discharging the output node OUT of FIG. 2.

A debounce circuit 228, coupled to the non-inverted output Q of the SR flip flop 226, has a timeout signal $S_{DIS\text{-}2}$ at its own output "1" in logic only if timeout signal $S_{DIS\text{-}1}$ lasts to be "1" for at least a predetermined time duration $T_{OUT\text{-}DIF}$. Otherwise, the timeout signal $S_{DIS\text{-}2}$ remains "0" in logic. An And gate 232 and a comparator 230 together control a switch 238. When the output voltage $V_{OUT}$ at power node VCC exceeds a predetermined safe voltage $V_{SAFE}$ which is 5.8V in FIG. 4 for example, and when the timeout signal $S_{DIS\text{-}2}$ is "1", the switch 238 is switched ON, providing a discharge path for discharging the output node OUT in FIG. 2. It is equivalent to say that the non-switching time $T_{NO\text{-}SWT}$ must exceed the summation of the predetermined time duration $T_{OUT\text{-}DIF}$ and the predetermined reference time $T_{OUT\text{-}1}$ to make the timeout signal $S_{DIS\text{-}2}$ "1", where this summation is referred to as another predetermined reference time $T_{OUT\text{-}2}$.

Figure 5:
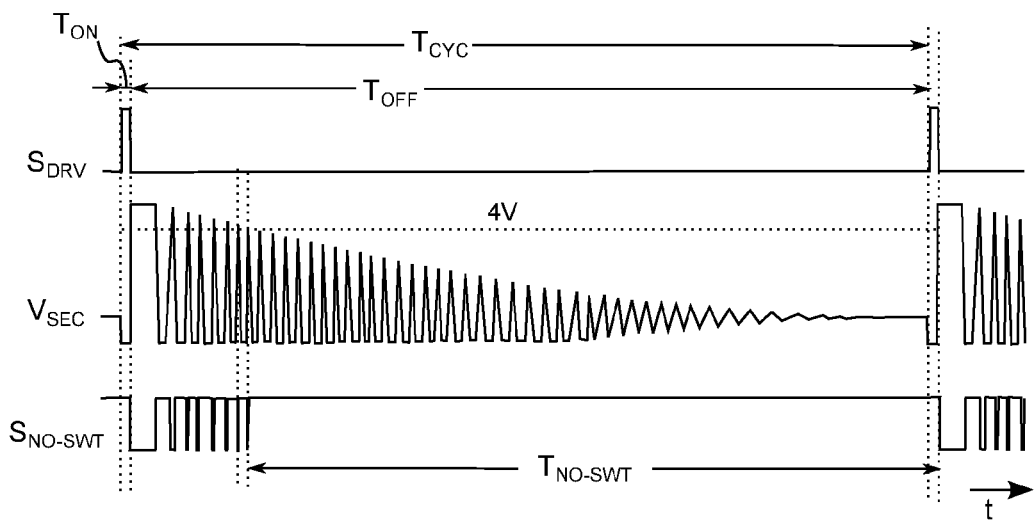
FIG. 5 demonstrates the waveforms of the PWM signal $S_{DRV}$, the winding voltage $V_{SEC}$, and the comparison result $S_{NO\text{-}SWT}$.

FIG. 5 demonstrates the waveforms of the PWM signal $S_{DRV}$, the winding voltage $V_{SEC}$ and the comparison result $S_{NO\text{-}SWT}$. One period of time when power switch 106 is ON is referred to as an ON time $T_{ON}$, and in the opposite one period of time when it is OFF is called an OFF time $T_{OFF}$. One ON time $T_{ON}$ and one OFF time $T_{OFF}$, adjacent to each other, are called a cycle time $T_{CYC}$. During an OFF time $T_{OFF}$ after the secondary winding SEC completes de-energizing, the winding voltage $V_{SEC}$ starts oscillating due to an LC tank in the primary side and this oscillation dampens over time because power steadily dissipates during oscillation. The comparison result $S_{NO\text{-}SWT}$ is generated by comparing the winding voltage $V_{SEC}$ with 4V as shown in FIG. 5, and defines a non-switching time $T_{NO\text{-}SWT}$. Also demonstrated in FIG. 5 is a much longer non-switching time $T_{NO\text{-}SWT}$, which starts at the moment when the magnitude of the oscillating winding voltage $V_{SEC}$ is less than 4V.

Figure 6:
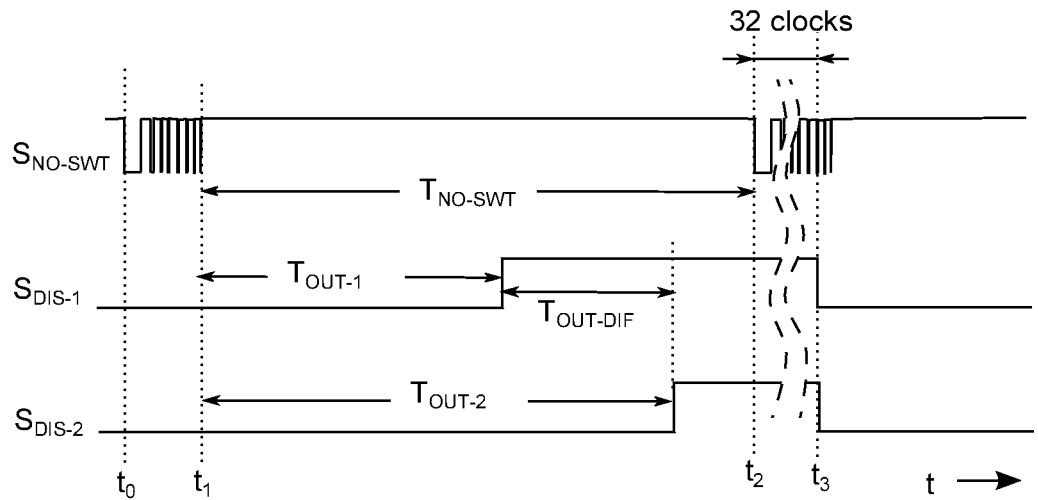
FIG. 6 shows, from top to bottom, the waveforms of the comparison result $S_{NO\text{-}SWT}$ the timeout signal $S_{DIS\text{-}1}$, and the timeout signal $S_{DIS\text{-}2}$.

FIG. 6 shows, from top to bottom, the waveforms of the comparison result $S_{NO\text{-}SWT}$ the timeout signal $S_{DIS\text{-}1}$, and the timeout signal $S_{DIS\text{-}2}$. As the comparison result $S_{NO\text{-}SWT}$ changes quickly within the time period from moment $t_0$ to moment $t_1$, each non-switching time $T_{NO\text{-}SWT}$ within this time period is too short, and therefore both timeout signals $S_{DIS\text{-}1}$ and $S_{DIS\text{-}2}$ remain "0" in logic. After moment $t_1$, the non-switching time $T_{NO\text{-}SWT}$ constantly increases as long as the comparison result $S_{NO\text{-}SWT}$ is kept to be "1". As demonstrated in FIG. 6, the non-switching time $T_{NO\text{-}SWT}$ is deemed to be the duration when the comparison result $S_{NO\text{-}SWT}$ continues staying at "1". When the non-switching time $T_{NO\text{-}SWT}$ is longer than the predetermined reference time $T_{OUT\text{-}1}$, the timeout signal $S_{DIS\text{-}1}$ turns to "1" in logic; and when it is further longer than the predetermined reference time $T_{OUT\text{-}2}$, the timeout signal $S_{DIS\text{-}2}$ also turns to "1" in logic. Starting from moment $t_2$, the comparison result $S_{NO\text{-}SWT}$ remains unchanged no more, possibly because PWM signal $S_{DRV}$ toggles and another cycle time $T_{CYC}$ starts.

Because of the counter 224, the timeout signal $S_{DIS-1}$ is reset to be "0" at moment $t_3$ when the comparison result $S_{NO-SWT}$ has generated 32 pulses in view of its waveform. It is derivable from FIG. 4 that a timeout signal $S_{DIS-1}$ with "0" in logic also makes the timeout signal $S_{DIS-2}$ "0". Please note that, once the discharge current $I_{DIS-1}$ in FIG. 4 starts discharging output node OUT, the discharging will last at least for a certain period of time before it is stopped, and this certain period of time (a discharge time) is 32 clock pulses defined by the comparison result $S_{NO-SWT}$.

In order to let dummy-load control unit 202 operate properly, it would be better to make the power controller 108 output PWM signal $S_{DRV}$ with requirements under corresponding specific conditions, thereby the power controller 108 hand-shaking with dummy-load control unit 202. In the embodiment shown in FIG. 2, PWM signal $S_{DRV}$ has a first minimum cycle time $T_{CYC-MIN-NORMAL}$ which is 1/(20 kHz) for example, if the power controller 108 determines the load 104 is a light load or no load, and the output voltage $V_{OUT}$ is well regulated at about the output rating voltage, 5V. In another case that the power controller 108 determines the present load 104 is a light load or no load, and the output voltage $V_{OUT}$ is a high charging voltage exceeding the predetermined safe voltage $V_{SAFE}$, which is 5.8V, then PWM signal $S_{DRV}$ has a second minimum cycle time $T_{CYC-MIN-QH}$ which is 1/(1 kHz) for example. The embodiment in FIG. 2 is better to have the predetermined reference time $T_{OUT-1}$ less than the first minimum cycle time $T_{CYC-MIN-NORMAL}$ and the predetermined reference time $T_{OUT-2}$ between the first minimum cycle time $T_{CYC-MIN-NORMAL}$ and the second minimum cycle time $T_{CYC-MIN-QH}$.

The dummy-load control unit 202 in FIG. 2 could know how heavy or light the load 104 is by sensing the length of the non-switching time $T_{NI-SWT}$ rather than by directly sensing the current through the load 104.

Once a non-switching time $T_{NO-SWT}$ has exceeded the predetermined reference time $T_{OUT-1}$, it can be expected by the dummy-load control unit 202 that the load 104 is presently a light load or no load. In response, the dummy-load control unit 202 conducts the discharge current $I_{DIS-1}$ to slightly discharge output node OUT, so as to prevent output voltage $V_{OUT}$ from further increasing and running away from the output rating voltage (5V). This output voltage run-away could result from RSC that need to periodically energize the transformer in order to sense output voltage $V_{OUT}$ from the primary side.

Once a non-switching time $T_{NO-SWT}$ is very long and exceeds the predetermined reference time $T_{OUT-2}$, the dummy-load control unit 202 can reasonably assume not only that the load 104 was quickly charged under a high charging voltage, but also the load 104 has become a light load or no load possibly, probably because the charging to the load 104 has completed or the load 104 is removed. Since a light load or no load requires a high charging voltage no more, the output voltage $V_{OUT}$ at output node OUT should return to its output rating voltage (5V) as soon as possible, not to cause overvoltage damage or stress to another load that is next connected for charging. Accordingly, when a non-switching time $T_{NO-SWT}$ exceeds the predetermined reference time $T_{OUT-2}$, the discharge current $I_{DIS-2}$, larger than the discharge current $I_{DIS-1}$, is provided to quickly pull down the output voltage $V_{OUT}$, unit until the output voltage $V_{OUT}$ is below the predetermined safe voltage $V_{SAFE}$.

When the load 104 is normal, heavier than a light load, the cycle time of the PWM signal $S_{DRV}$ should be less than the first minimum cycle time $T_{CYC-MIN-NORMAL}$, or preferably less than the predetermined reference time $T_{OUT-1}$. Therefore, when the load is normal, both the discharge currents $I_{DIS-1}$ and $I_{DIS-2}$ are stopped from discharging the output node OUT, and the dummy-load control unit 202 contributes only ignorable power consumption to the whole power system, causing substantially no harm to power conversion efficiency.

Figure 7:
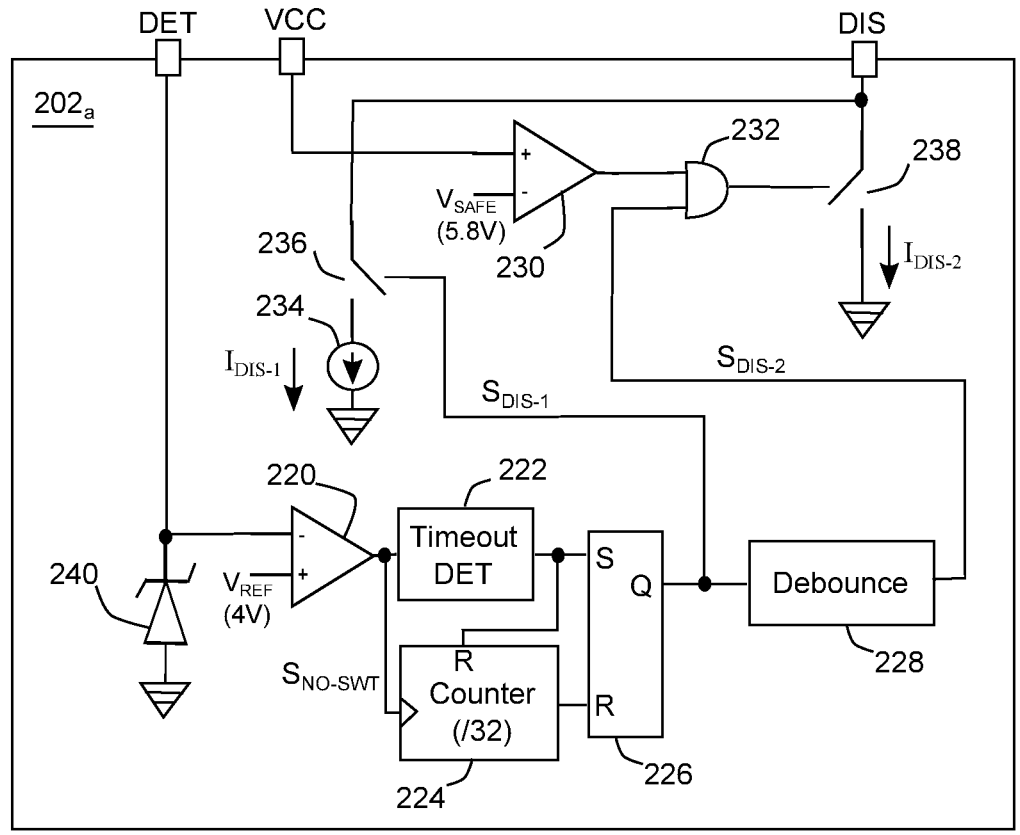
FIG. 7 demonstrates another dummy-load control unit $202_a$ according to embodiments of the invention.

The discharge currents $I_{DIS-1}$ and $I_{DIS-2}$ drain current from power node VCC and discharge node DIS respectively, but this invention is not limited to. FIG. 7 demonstrates another dummy-load control unit $202_a$ according to embodiments of the invention, where both the charge currents $I_{DIS-1}$ and $I_{DIS-2}$ drain current from discharge node DIS to output ground $GND_{OUT}$.

Figure 8:
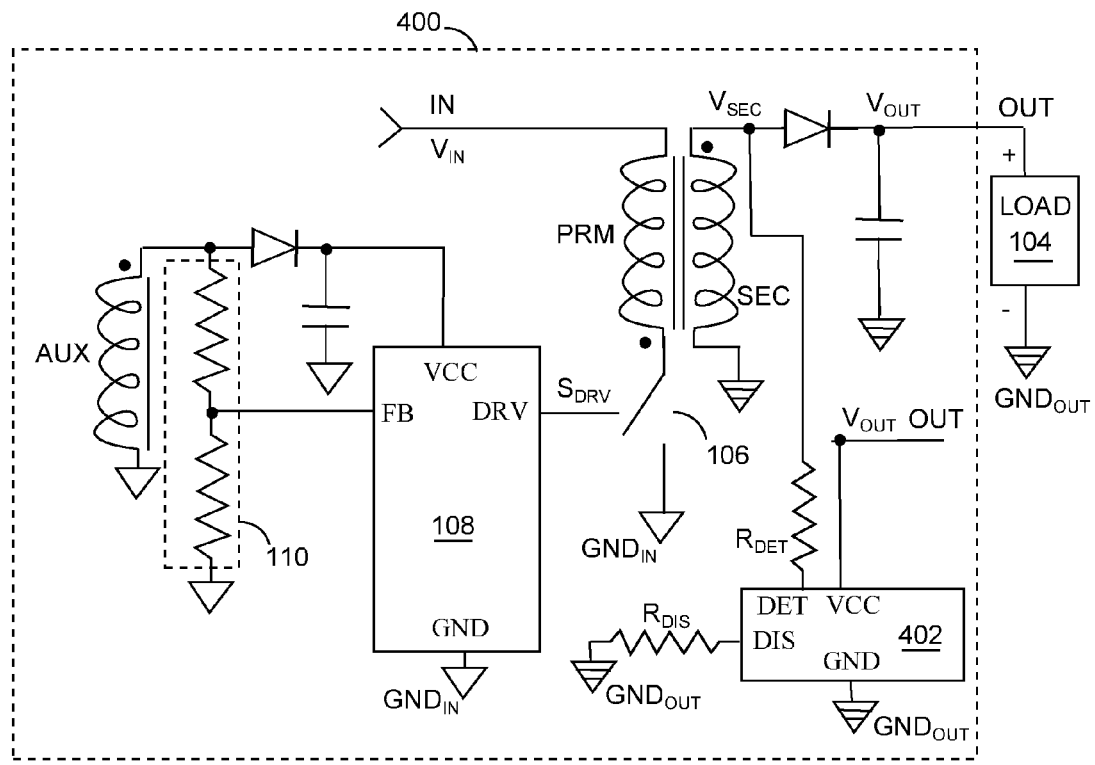
FIG. 8 shows another charger according to embodiments of the invention.
Figure 9:
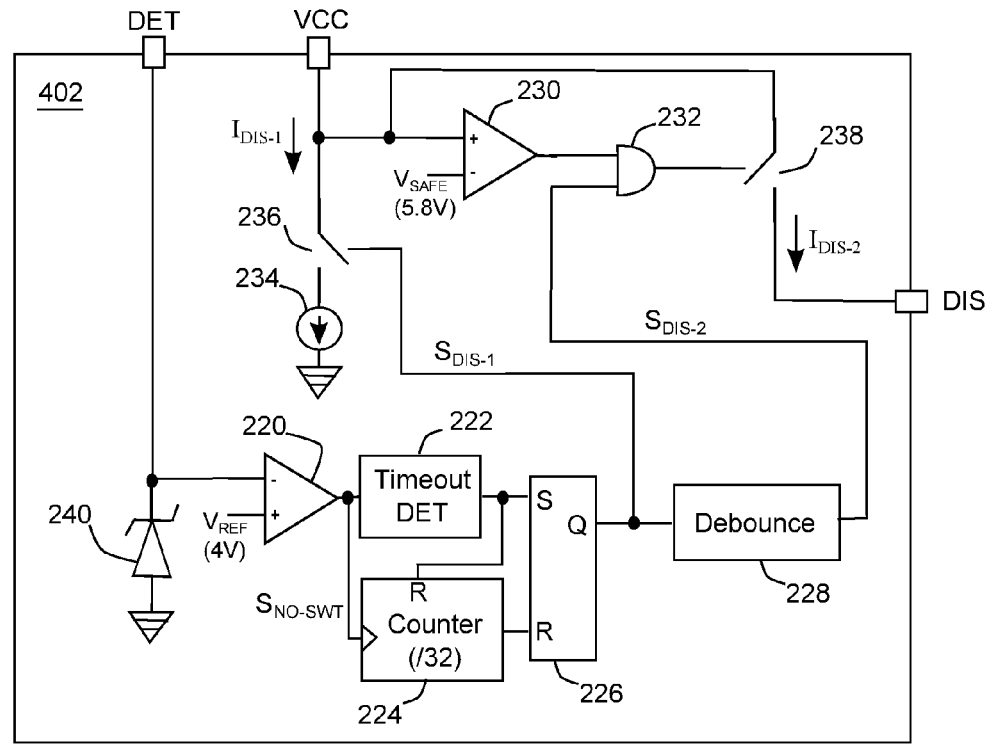
FIG. 9 exemplifies the dummy-load control unit in FIG. 8.

FIG. 8 shows another charger 400 according to embodiments of the invention. The common devices or the similar devices between FIG. 8 and FIG. 2 could be comprehensible by the aforementioned teaching so their details are omitted herein for brevity. FIG. 9 exemplifies the dummy-load control unit 402 in FIG. 8, where the discharge current $I_{DIS-2}$, if exists, flows from output node OUT, via power node VCC, switch 238, discharge node DIS, discharge resistor $R_{DIS}$, and to output ground $GND_{OUT}$. The dummy-load control unit 402 in FIGS. 8 and 9 is beneficial in that the discharge node DIS therein need not support or sustain the high charging voltage possibly occurring at output node OUT. In other words, the circuitry for the discharge node DIS in FIGS. 8 and 9 could be simpler and cheaper than that for the discharge node DIS in FIGS. 2 and 4.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method suitable for a power converter with a primary winding and a secondary winding isolated from each other, wherein the secondary winding is capable of de-energizing to provide an output voltage at an output node to power a load, the control method comprising:
   sensing a winding voltage across the secondary winding;
   providing a non-switching time based upon the winding voltage;
   checking if the non-switching time exceeds a predetermined reference time;
   comparing the output voltage with a predetermined voltage; and
   providing a discharge current to drain from the output node and to lower the output voltage if the non-switching time exceeds the predetermined reference time and the output voltage exceeds the predetermined voltage.

2. The control method of claim 1, wherein the predetermined reference time is a second reference time and the discharge current is a second discharge current, the control method further comprising:
   providing a first discharge current to drain from the output node and to lower the output voltage if the non-switching time exceeds a first reference time and is less than the second reference time.

3. The control method of claim 1, wherein the second discharge current is larger than the first discharge current.

4. The control method of claim 1, wherein, when the load is a light load or no load, the output voltage is regulated to be an output rating voltage less than the predetermined voltage.

5. The control method of claim 4, wherein the primary winding is at a primary side and the secondary winding is at a secondary side, the control method comprising:
regulating the output voltage at the output rating voltage;
regulating the output voltage at a charging voltage higher than the output rating voltage;
providing a PWM signal to control a power switch connected in series with the primary winding; and
making a cycle time of the PWM signal longer than the predetermined reference time if the load is determined to be a light load or no load.

6. The control method of claim 5, wherein the predetermined reference time is a second reference time and the discharge current is a second discharge current, the control method further comprising:
providing a first discharge current to drain from the output node and to lower the output voltage if the non-switching time exceeds a first reference time and is less than the second reference time; and
making another cycle time of the PWM signal longer than the first reference time and less than the second reference time when the output voltage is regulated at the output rating voltage and the load is at light load or no load.

7. The control method of claim 1, further comprising:
comparing the winding voltage with a reference voltage to provide a comparison result;
wherein the non-switching time is a duration when the comparison result stays at a first logic value.

8. The control method of claim 7, comprising:
continuing providing the discharge current for a predetermined discharge time.

9. The control method of claim 8, wherein the predetermined discharge time is counted by using the comparison result as a clock.

10. The control method of claim 1, further comprising:
stopping the discharge current if the output voltage is less than the predetermined voltage.

11. A dummy-load control unit, suitable for a power supply with a primary winding and a secondary winding isolated from each other, wherein the secondary winding is configured to de-energize and to build an output voltage at an output node for powering a load, the dummy-load control unit comprising:
a detection node coupled to the secondary winding;
a first comparator with a first input coupled to the detection node, a second input coupled to a reference voltage and an output providing a comparison result;
a debounce circuit coupled to the first comparator for turning on a timeout signal when the comparison result has stayed in a first predetermined value for a predetermined reference time;
a second comparator for comparing the output voltage with a predetermined voltage; and
a logic coupled to the debounce circuit and the second comparator;
wherein when the output voltage exceeds the predetermined voltage and the timeout signal is turned on, the logic provides a discharge path for discharging the output node to lower the output voltage.

12. The dummy-load control unit of claim 11, wherein the predetermined reference time is a second predetermined reference time, and the timeout signal is a second timeout signal, the dummy-load control unit further comprising:
a timeout detector coupled between the debounce circuit and the first comparator, for turning on a first timeout signal when the comparison result has stayed in the first predetermined value for a first predetermined reference time;
wherein when the first timeout signal is turned on, a first discharge current is provided to discharge the output node.

13. The dummy-load control unit of claim 12, wherein the discharge path provides a second discharge current for discharging the output node, and the second discharge current is larger than the first discharge current.

14. The dummy-load control unit of claim 12, wherein the debounce circuit provides the second time output signal based on the first timeout signal.

15. The dummy-load control unit of claim 12, further comprising:
a counter with a clock input receiving the comparison result;
wherein when the comparison result has stayed in the first predetermined value for the first predetermined reference time, the counter is reset.

16. The dummy-load control unit of claim 15, wherein when a count result of the counter exceeds a predetermined number, the first timeout signal is turned off.

17. The dummy-load control unit of claim 11, wherein when the output voltage is less than the predetermined voltage, the logic disconnects the discharge path that discharges the output node.

* * * * *